US010661685B2

(12) United States Patent
Kim et al.

(10) Patent No.: US 10,661,685 B2
(45) Date of Patent: May 26, 2020

(54) PUMPING APPARATUS FOR VEHICLE SEAT

(71) Applicants: Jae Ho Kim, Ulsan (KR); Ji Yong Park, Ulsan (KR)

(72) Inventors: Jae Ho Kim, Ulsan (KR); Ji Yong Park, Ulsan (KR)

(73) Assignee: DAS Co., Ltd. (KR)

( * ) Notice: Subject to any disclaimer, the term of this patent is extended or adjusted under 35 U.S.C. 154(b) by 489 days.

(21) Appl. No.: 15/484,704

(22) Filed: Apr. 11, 2017

(65) Prior Publication Data
US 2018/0001794 A1    Jan. 4, 2018

(30) Foreign Application Priority Data

Jun. 29, 2016    (KR) .......................... 10-2016-0081478

(51) Int. Cl.
*B60N 2/00*    (2006.01)
*B60N 2/16*    (2006.01)
(Continued)

(52) U.S. Cl.
CPC .......... *B60N 2/1635* (2013.01); *B60N 2/168* (2013.01); *B60N 2/938* (2018.02); *F16D 41/06* (2013.01)

(58) Field of Classification Search
CPC ...... B60N 2/1635; B60N 2/938; B60N 2/168; B60N 2/2252; F16D 41/06; B60Y 2306/09; B60Y 2410/124
See application file for complete search history.

(56) References Cited

U.S. PATENT DOCUMENTS

| 6,675,945 B2 * | 1/2004 | Kim | .................. | B60N 2/167 |
| | | | | 192/223 |
| 7,032,731 B2 * | 4/2006 | Kim | .................. | B60N 2/167 |
| | | | | 192/15 |

(Continued)

FOREIGN PATENT DOCUMENTS

| CN | 204895190 U | 12/2015 |
| KR | 10-0490313 B1 | 1/2005 |

(Continued)

OTHER PUBLICATIONS

Office Action for corresponding German application No. 10 2017 206 231.2 dated Nov. 6, 2017.

*Primary Examiner* — Victor L Macarthur
(74) *Attorney, Agent, or Firm* — Tarolli, Sundheim, Covell & Tummino LLP (57) ABSTRACT

Disclosed herein is a pumping apparatus for a vehicle seat, which includes an input member rotated by torque input from a handle lever, a clutch unit configured to transmit the input torque to a link mechanism of a seat cushion, a brake unit configured to cut off the torque input in reverse from the link mechanism, a housing accommodating the clutch unit therein, and a fixing member coupled to a rear end of the housing, wherein the input member includes a first input member disposed in front of the housing, and a second input member connected to the first input member and accommodated in the housing, and the clutch unit includes a torque transmission member arranged on an outer peripheral surface of the second input member, and an annular control member having a clutch friction surface formed on an inner peripheral surface thereof.

15 Claims, 9 Drawing Sheets

(51) Int. Cl.
*B60N 2/90* (2018.01)
*F16D 41/06* (2006.01)

(56) References Cited

U.S. PATENT DOCUMENTS

| | | | |
|---|---|---|---|
| 8,292,367 B2* | 10/2012 | Park | B60N 2/168 297/344.12 |
| 8,820,501 B2* | 9/2014 | Hur | B60N 2/167 192/15 |
| 9,469,219 B2* | 10/2016 | Kim | B60N 2/22 |
| 9,821,685 B2* | 11/2017 | Kim | B60N 2/165 |
| 9,987,952 B2* | 6/2018 | Chae | B60N 2/169 |
| 10,118,507 B2* | 11/2018 | Chae | B60N 2/1635 |
| 2003/0173182 A1* | 9/2003 | Kim | B60N 2/167 192/223.2 |
| 2005/0006193 A1* | 1/2005 | Kim | B60N 2/167 192/15 |
| 2009/0184554 A1* | 7/2009 | Paing | B60N 2/167 297/358 |
| 2009/0273218 A1* | 11/2009 | Park | B60N 2/168 297/284.6 |
| 2012/0273319 A1* | 11/2012 | Hur | B60N 2/167 192/15 |
| 2015/0158398 A1* | 6/2015 | Kim | B60N 2/22 297/344.12 |
| 2015/0314708 A1* | 11/2015 | Kim | B60N 2/165 297/344.12 |
| 2015/0314709 A1* | 11/2015 | Kim | B60N 2/165 297/344.12 |
| 2017/0096083 A1* | 4/2017 | Lee | B60N 2/1635 |
| 2017/0253148 A1* | 9/2017 | Chae | B60N 2/169 |
| 2017/0253149 A1* | 9/2017 | Chae | B60N 2/1635 |
| 2018/0001794 A1* | 1/2018 | Kim | B60N 2/938 |

FOREIGN PATENT DOCUMENTS

| | | |
|---|---|---|
| KR | 10 2013 0024640 A | 3/2013 |
| KR | 10 1283124 B1 | 7/2013 |
| KR | 10-1361520 B1 | 2/2014 |
| KR | 10-1417523 B1 | 7/2014 |
| KR | 10-1556898 B1 | 10/2015 |

* cited by examiner

PUMPING APPARATUS FOR VEHICLE SEAT

CROSS-REFERENCE TO RELATED APPLICATIONS

This application claims priority to Korean Patent Application No. 10-2016-0081478, filed on Jun. 29, 2016, the disclosure of which is incorporated herein by reference in its entirety.

BACKGROUND OF THE INVENTION

Field of the Invention

Exemplary embodiments of the present invention relate to a pumping apparatus for a vehicle seat, and more particularly, to a pumping apparatus capable of adjusting a height of a seat and maintaining the adjusted height in such a manner that a user operates a separate link mechanism installed in the seat with operating force.

Description of the Related Art

In general, a variety of convenient devices are provided in a driver seat, a passenger seat, and seats for other passengers, which are installed in the front and rear of a vehicle interior, for comfortableness of occupants.

As these convenient devices, there are provided a sliding function of adjusting a seat by pushing or pulling it in a forward or backward direction and a reclining function of adjusting the inclination of a backrest, according to the body type of an occupant.

Figure 1:
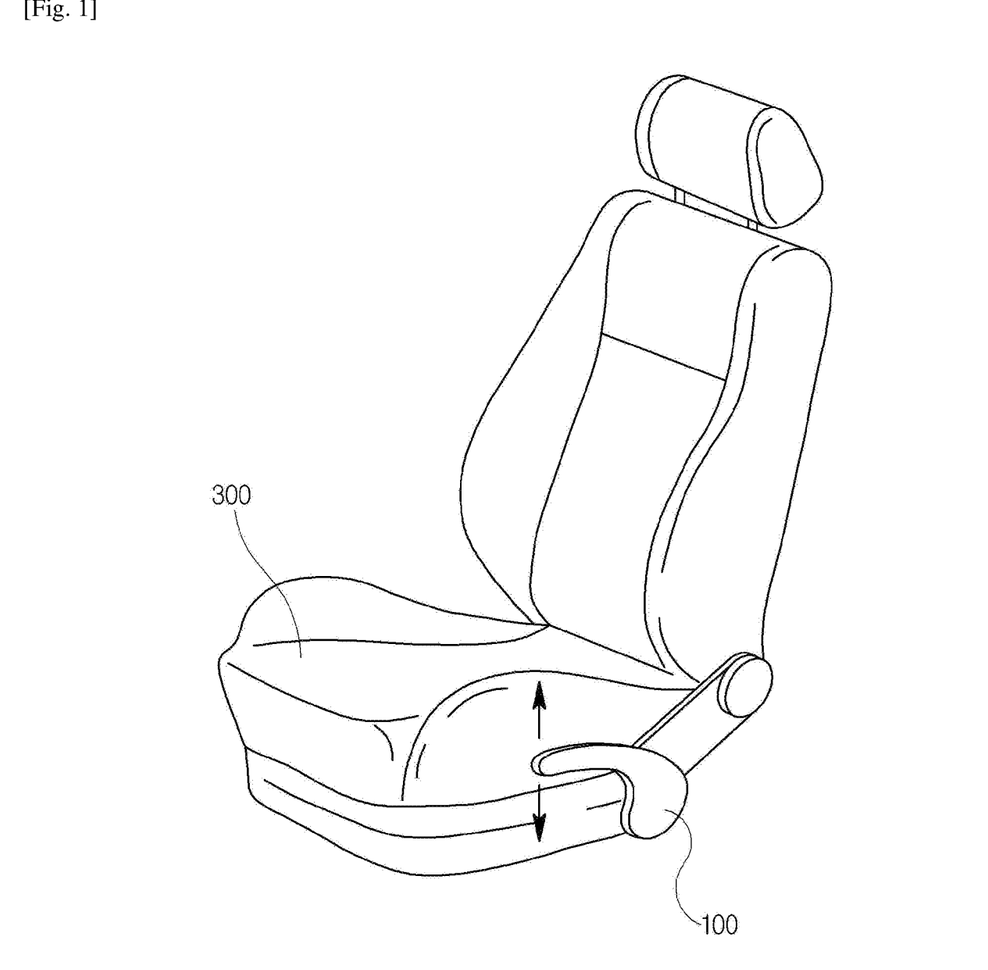
FIG. 1 is a perspective view illustrating a vehicle seat having a height adjustment function.

As illustrated in FIG. 1, there is also provided a height adjustment function of adjusting the height of a seat cushion 300 using a pumping device so as to be suitable for an occupant by adjusting the height of the seat cushion 300 by input received from a handle lever 100.

The pumping device largely includes an input member, a clutch member, a brake member, and a housing for accommodating them. The input member serves to convert the vertical operating force input from a user into rotational force, and to transmit the rotational force to the clutch member and the brake member. The clutch member serves to transmit the input operating force of the user to a link means of a seat. The brake member serves to cut off torque input in reverse from the link means to fix the link means the operation of which is completed, thereby maintaining the height of the seat cushion 300.

In addition, the housing defines the external appearance of the pumping device, accommodates the members therein, and functions to prevent introduction of foreign substances.

Each of the input member, the clutch member, and the brake member is typically made of metal with high strength and has a large thickness so as to resist a significantly high torque.

As an example of pumping devices, Korean Patent Application Publication No. 2012-0050394 discloses a pumping device that includes a drive member 20 and a metal ring 33, wherein the drive member 20 forms a clutch member and is made of metal with strength over a certain level while having a large thickness, and the metal ring 33 forms a brake member and is also made of metal with strength over a certain level while having a large thickness.

However, the weight of the pumping device disclosed in the patent document may be relatively increased due to the complex drum-shaped drive member 20 having an open surface and a closed surface and the metal ring 33. Since the pumping device has a very complicated structure, it is difficult to control a tolerance when the pumping device is manufactured, and the cost of manufacture may be increased.

In addition, the cover 12 of the pumping device disclosed in the patent document is not a component to which a load is directly applied when the pumping device is operated, but is made of a metal material similar to the drive member 20 and the metal ring 33. Hence, the weight of the pumping device may be further increased.

PRIOR ART DOCUMENT

Patent Document (Patent Document 1) Korean Patent Application Publication No. 2012-0050394

SUMMARY OF THE INVENTION

An object of the present invention is to provide a pumping apparatus for a vehicle seat, the weight of which can be significantly reduced compared to the related art by application of an annular control member that is open at the front and rear thereof and a fixing member that is open at the front and rear thereof, and which has a simple structure so that it is possible to easily control tolerances when it is manufactured and to significantly reduce the cost of manufacture.

Another object of the present invention is to provide a pumping apparatus for a vehicle seat, the weight of which can be further reduced by application of a housing with a relatively lower specific gravity and strength than the control member and the fixing member.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a pumping apparatus for a vehicle seat includes an input member rotated by torque input from a handle lever, a clutch unit configured to transmit the input torque to a link mechanism of a seat cushion, a brake unit configured to cut off the torque input in reverse from the link mechanism, a housing accommodating the clutch unit therein, and a fixing member coupled to a rear end of the housing to be fastened to one side of a seat, wherein the input member includes a first input member disposed in front of the housing, and a second input member forcibly connected to the first input member and accommodated in the housing, and the clutch unit includes a torque transmission member arranged on an outer peripheral surface of the second input member, and an annular control member having a clutch friction surface formed on an inner peripheral surface thereof for frictional engagement with the torque transmission member, the control member being open at front and rear portions thereof.

The fixing member may include an annular brake drum having a stop friction surface formed on an inner peripheral surface thereof for braking of the brake unit and accommodating the brake unit, the brake drum being open at front and rear portions thereof.

The pumping apparatus may further include a plate cover member disposed behind the fixing member so as to prevent axial separation of the clutch unit and the brake unit and fastened to the housing while enclosing the fixing member so as to couple the fixing member to the housing.

The brake unit may include an output member configured such that a rear end thereof is connected to the link mechanism and a wedge inclined surface is formed on an outer peripheral surface of a front end thereof, and a plurality of braking members inserted between the wedge inclined surface and the stop friction surface to control rotation of the output member, and the brake unit may be disposed behind the housing.

The fixing member may be made of a metal material and the housing may be made of a synthetic resin material.

The pumping apparatus may further include an elastic member disposed between the control member and the output member, for providing an elastic force such that the second input member is pressed against the housing.

The pumping apparatus may further include a return spring disposed between the housing and the first input member, for providing a restoring force to the input member.

The return spring may include an annular ring, and first and second ends bent radially outwardly from the ring.

The return spring may further include a bending portion formed in the ring between the first end and the second end so that the first and second ends are maintained at the same position in an axial direction of the input member.

The first input member may include a disk having a center hole into which a front end of the second input member is fixedly inserted, and a pair of pressure legs extending and bent from an outer peripheral surface of the disk, and the first and second ends may extend between the pair of pressure legs so that the restoring force of the return spring is transmitted through the pressure legs.

The housing may include a cylindrical body accommodating the clutch unit therein and having a through-hole through which the front end of the second input member extends, a pair of first stopper protrusions extending from a front edge of the cylindrical body in a direction parallel to the axial direction and spaced at a first distance from each other, and a second stopper protrusion extending from the front edge of the cylindrical body in a direction parallel to the axial direction and spaced at a second distance from the pair of first stopper protrusions, and the first and second ends of the return spring may extend between the pair of first stopper protrusions.

The first input member may further include at least one stop leg extending and bent from the outer peripheral surface of the disk, and the stop leg may extend between the first and second stopper protrusions so that an angle of rotation of the first input member is restricted to the second distance.

The housing may further include a boss formed around the through-hole of the cylindrical body and extending in a direction parallel to the axial direction, and the housing may have a spring groove formed between an outer peripheral surface of the boss and the pair of first stopper protrusions and between the outer peripheral surface of the boss and the second stopper protrusion to accommodate the ring of the return spring.

The return spring may have a coil shape and be inserted into a spring groove formed in the housing, and the return spring may be pressed by a pair of pressure legs of the first input member that are inserted into both sides of the spring groove.

A predetermined gap may be formed between an outer peripheral surface of the control member and an inner peripheral surface of the housing.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereinafter, a pumping apparatus for a vehicle seat according to exemplary embodiments of the present invention will be described in more detail with reference to the accompanying drawings.

The present invention may be embodied in different forms and should not be construed as limited to the embodiments set forth herein. The specific exemplary embodiments of the present invention will be described herein in detail with reference to the accompanying drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the accompanying drawings of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise.

It will be further understood that the terms "comprises/comprising" or "includes/including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

In addition, the following embodiments are provided so that this disclosure will be thorough and complete, and will fully convey the scope of the present invention to those skilled in the art. In the drawings, the shape, size, or the like of each component may be exaggerated for convenience of description and clarity.

Figure 2:
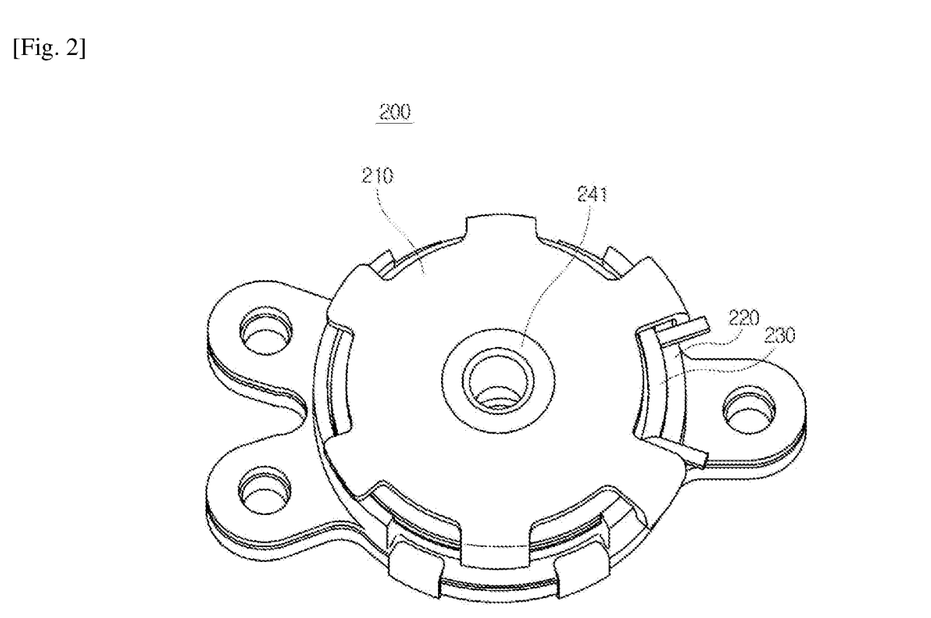
FIG. 2 is a front perspective view illustrating a pumping apparatus according to an embodiment of the present invention.
Figure 3:
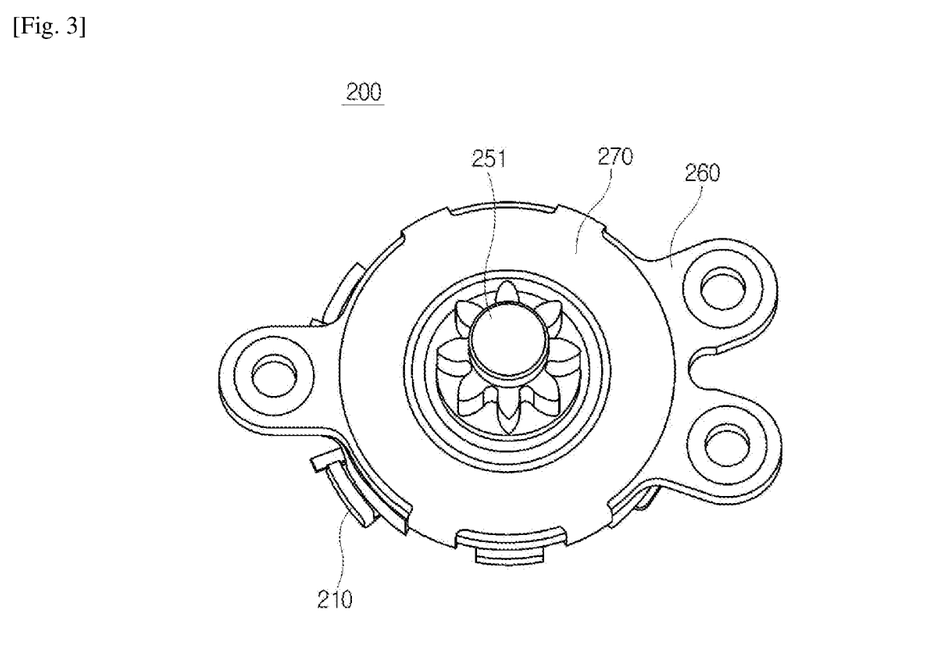
FIG. 3 is a rear perspective view illustrating the pumping apparatus of FIG. 2.
Figure 4:
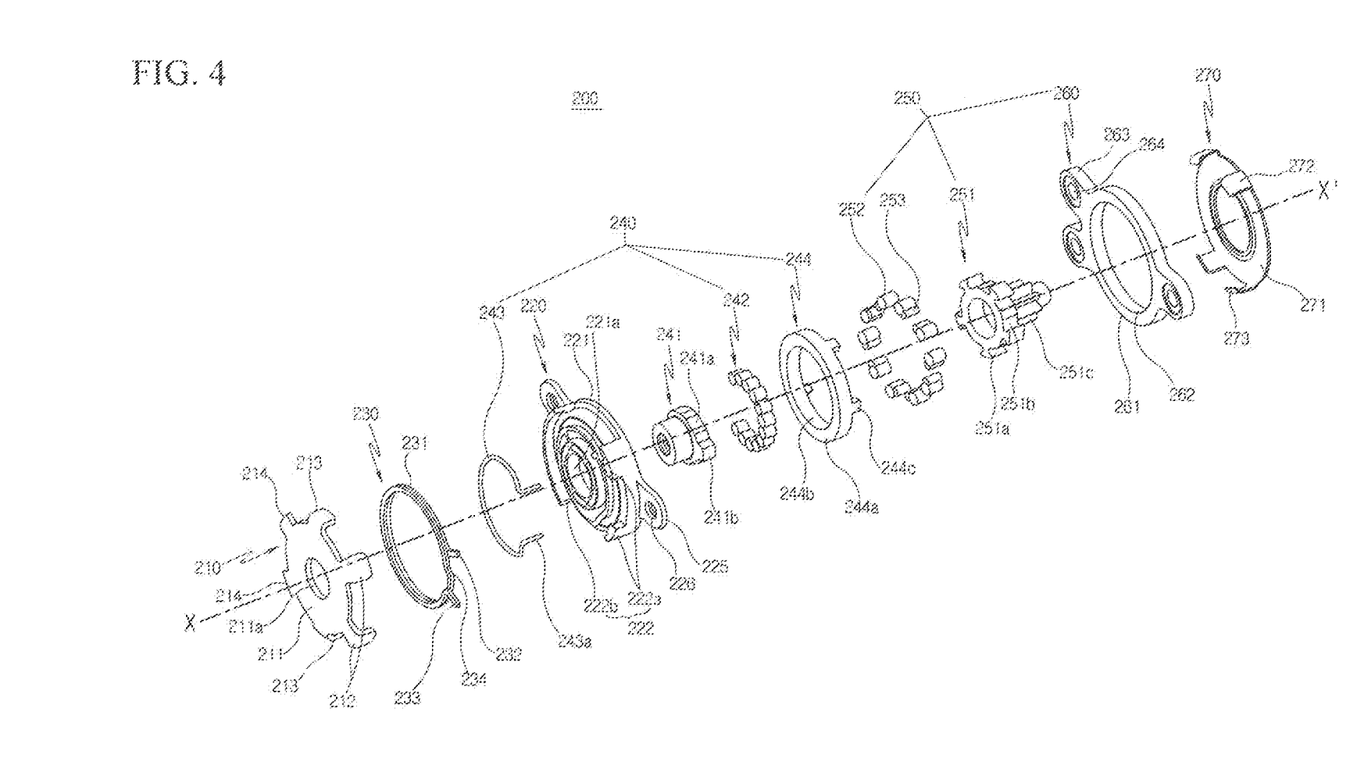
FIG. 4 is an exploded perspective view of the pumping apparatus illustrated in FIGS. 2 and 3.

FIG. 2 is a front perspective view illustrating a pumping apparatus 200 according to an embodiment of the present invention. FIG. 3 is a rear perspective view illustrating the pumping apparatus 200 of FIG. 2. FIG. 4 is an exploded perspective view of the pumping apparatus 200 illustrated in FIGS. 2 and 3.

Referring to FIGS. 2 to 4, the pumping apparatus for a vehicle seat 200 according to the embodiment of the present invention includes an input member that is rotated by torque input from the handle lever of FIG. 1, a return spring 230 that generates a restoring force for returning the input member to an initial position, a clutch unit 240 that transmits the input torque to a link mechanism of a seat cushion 300, a brake unit 250 that cuts off the torque input in reverse from the link mechanism, a housing 220 that accommodates the clutch unit 240 therein, a fixing member 260 that is coupled to the rear end of the housing 220 to be fastened to one side of a seat, and a cover member 270 that is coupled to the rear end of the fixing member 260 so as to prevent the separation of the clutch unit 240 and the brake unit 250.

The input member serves to convert the vertical operating force input from a user into rotational force, and to transmit the converted rotational force to the clutch unit 240 and the brake unit 250. The input member includes a first input member 210 that is disposed in front of the housing 220, and a second input member 241 that is forcibly connected to first input member 210 and is accommodated in the housing 220.

In more detail, the first input member 210 includes a disk 211 that has a center hole 211a formed in the center thereof so that the front end of the second input member 241 is fixedly inserted into the center hole 211a, a pair of pressure legs 212 that extend and are bent from the outer peripheral surface of the disk 211, and at least one stop leg 213 that extends and is bent from the outer peripheral surface of the disk 211.

The disk 211 is manufactured by processing a metal plate having a substantially uniform thickness in a disk form, and has the center hole 211a formed in the center thereof. The front end of the second input member 241 is securely fixed into the center hole 211a by welding or the like.

The pressure legs 212 are parts to which the restoring force of the return spring 230 is transmitted, and are formed by extending and being bent from the outer peripheral surface of the disk 211. First and second ends 232 and 233 of the return spring 230 extend between the pressure legs 212 so that the restoring force of the return spring 230 is transmitted through the pressure legs 212.

The stop leg 213 is formed by extending and being bent from the outer peripheral surface of the disk 211 so as to extend between first and second stopper protrusions 222a and 222b of the housing 220 which will be described later. The stop leg 213 has the purpose of restricting the angle of rotation of the first input member 210 to a second distance L2 between the first and second stopper protrusions 222a and 222b.

As illustrated in the drawings, the first input member 210 of the pumping apparatus 200 according to the embodiment of the present invention may further include a pair of guide legs 214 that extend and are bent from the outer peripheral surface of the disk 211 so as to prevent separation of an annular ring 231 of the return spring 230 in an axial direction (X-X') which will be described later.

The second input member 241 is positioned in a space within the housing 220 in a state in which the front end of the second input member 241 is inserted and securely fixed into the first input member 210, and serves to transmit the input torque to the control member 244 in one direction through torque transmission members to be described later.

To transmit the torque in one direction, the second input member 241 has a plurality of concave curved or flat cam surfaces 214a that are radially formed on the outer peripheral surface of the rear end thereof, and a plurality of torque transmission members are arranged on the cam surfaces 214a.

The return spring 230 is configured to generate a restoring force for returning the input member to an initial position. The return spring 230 includes an annular ring 231 that is disposed between the front outer surface of the housing 220 and the first input member 210, and first and second ends 232 and 233 that are bent radially outwardly from the ring 231.

As illustrated in the drawings, the return spring 230 of the pumping apparatus 200 according to the embodiment of the present invention is in the form of a coil spring configured such that the first and second ends 232 and 233, which are both ends of the return spring 230, are bent radially outwardly.

The detailed description of the return spring 230 will be given later with reference to FIGS. 6 and 7.

The clutch unit 240 includes the torque transmission members that are arranged along the cam surfaces 241a of the second input member 241, and the annular control member 244 that rotates along with the rotation of the second input member 241 through frictional contact with the torque transmission members.

The torque transmission members are restrained between the cam surfaces 241a and the inner peripheral surface of the control member 244, and thus rotate the control member 244 by moving together with the cam surfaces 241a when the second input member 241 rotates. Although the torque transmission members are illustrated to be clutch rollers 242 in FIG. 4, the present invention is not limited thereto. The torque transmission members may be changed to have different shapes. Hereinafter, the clutch rollers 242 illustrated as the torque transmission members will be described with reference to the drawings.

As illustrated in FIG. 4, the clutch unit 240 may further include a clutch spring 243 that provides an elastic restoring force for returning the clutch rollers 242 to initial positions.

As illustrated in FIG. 4, the clutch spring 243 is preferably an annular spring, the ends of which are bent in the axial direction (X-X') in consideration of the axial thickness of the pumping apparatus 200. The clutch spring 243 is provided between the first input member 210 and the outer peripheral surface of the housing 220, and the bent ends 243a thereof extend to the clutch rollers 242 through the housing 220. As will be described later, the housing 220 is formed with spring holes 224 through which both ends 243a of the clutch spring 243 extend.

The control member 244 is configured to transmit the torque transmitted through the clutch rollers 242 to an output member 251 and at the same time to release the braking of the output member 251.

The control member 244 includes an annular clutch drum 244a that has a clutch friction surface 244b formed on the inner peripheral surface thereof for frictional engagement with the clutch rollers 242 and is made of a metal material with certain strength, and a plurality of control protrusions 244c that protrude toward the brake unit 250 from the side of the rear end of the clutch drum 244a.

In this case, the annular clutch drum 244a is open at both front and rear thereof as illustrated in the drawings.

Thus, since the clutch drum 244a of the pumping apparatus 200 according to the embodiment of the present invention is configured to be open at the front and rear thereof and have a simple annular shape, the weight of the pumping apparatus can be significantly reduced compared to the related art. In addition, since the pumping apparatus has a simple structure, it is possible to easily control tolerances when it is manufactured, and to significantly reduce the cost of manufacture.

The control protrusions 244c are configured to release the braking of the brake unit 250 and to transmit the torque to the brake unit 250. The control protrusions 244c extend to braking members, which will be described later, from the side of the rear end of the clutch drum 244a.

Figure 8:
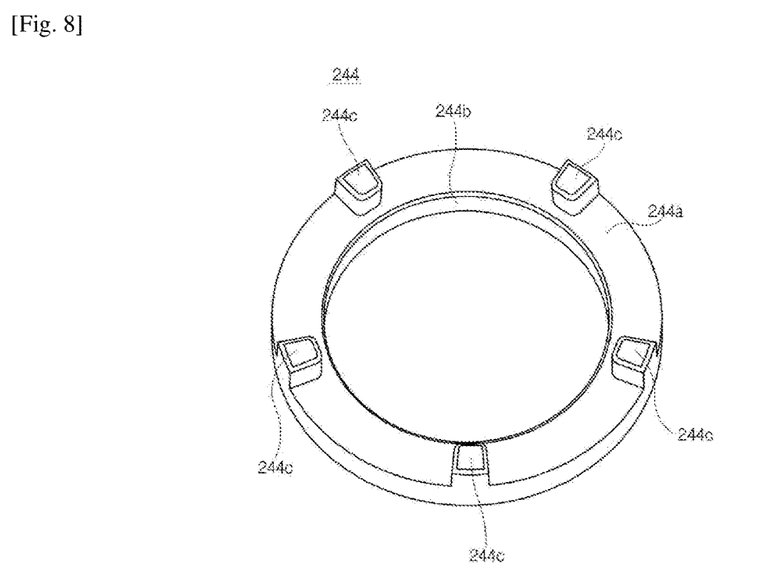
FIG. 8 is a perspective view for explaining a control member of the pumping apparatus illustrated in FIGS. 2 and 3.

The detailed configuration and operation of the clutch unit 240 including the control member 244 will be described later with reference to FIGS. 8 and 9.

As described above, the brake unit 250 transmits the torque transmitted from the control member 244 of the clutch unit 240 to the link mechanism (not shown) and simultaneously cuts off the torque input in reverse from the link mechanism, thereby maintaining the height of the seat cushion.

To this end, the brake unit 250 includes an output member 251 configured such that the rear end thereof is connected to the link mechanism and wedge inclined surfaces 251b are formed on the outer peripheral surface of the front end thereof, a plurality of braking members that are inserted between the wedge inclined surfaces 251b and a stop friction surface 262 of the fixing member 260 to control the rotation of the output member 251, and wedge springs 253 that maintain the braking of the braking members.

As illustrated in the drawings, the output member 251 includes a plurality of wedge bosses 251a formed at regular intervals on the outer peripheral surface of the front end thereof, and an output gear 251 that is formed on the rear end thereof and engages with a sector gear of a link member (not shown).

In addition, the paired wedge inclined surfaces 251b are symmetrically formed on the outer peripheral surface between the wedge bosses 251a of the output member 251.

The braking members are inserted into the wedge inclined surfaces 251b of the output member 251 and the stop friction surface 262 of the fixing member 260 to control the rotation of the output member 251. The braking members are paired and each fitted into the wedge inclined surface 251b between the wedge bosses 251a so as to implement the braking of the bidirectional rotation of the output member 251.

Each of the wedge springs 253 is inserted between one surface of the associated one of the wedge bosses 251a and the associated one of the braking members, so as to maintain the braking of the output member by pressing the braking members toward the wedge inclined surfaces 251b.

Although the braking members are illustrated to be a plurality of wedge rollers 252 in FIG. 4, the present invention is not limited thereto. Any means may be used as the braking members 251 as long as it maintains the braking of the output member 251. Hereinafter, the wedge rollers 252 illustrated as the braking members will be described with reference to the drawings.

In addition, any means may be used as the wedge springs 253 as long as it presses the braking members toward the wedge inclined surfaces 251b.

The detailed description of the brake unit 250 to implement the braking of the output member using the wedge inclined surfaces 251b and the wedge rollers 252 will be given later with reference to FIGS. 10 and 11.

The housing 220 is configured to accommodate and protect the clutch unit 240 therein and to prevent introduction of foreign substances.

In more detail, the housing 220 includes a cylindrical body 221 that accommodates the clutch unit 240 therein and has a through-hole 221a through which the front end of the second input member 241 extends, a pair of first stopper protrusions 222a that extend from the front edge of the cylindrical body 221 in a direction parallel to the axial direction (X-X') and are spaced at a first distance L1 from each other, and a second stopper protrusion 222b that extends from the front edge of the cylindrical body 221 in a direction parallel to the axial direction (X-X') and is spaced at a second distance L2 from the first stopper protrusions 222a.

The detailed description of the cylindrical body 221 and the first and second stopper protrusions 222a and 222b will be given later with reference to FIG. 6.

The fixing member 260 is coupled to the rear end of the housing 220 to be fastened to one side of the seat. The fixing member 260 has the stop friction surface 262 for fixing the pumping apparatus 200 to the seat and implementing the braking of the brake unit 250.

To this end, the fixing member 260 of the pumping apparatus 200 according to the embodiment of the present invention includes an annular brake drum 261 that has a stop friction surface 262 formed on the inner peripheral surface thereof and is open at the front and rear thereof, and a fastening portion 263 that has a fastening hole 264 through which a fastener (not shown) extends.

Figure 11:
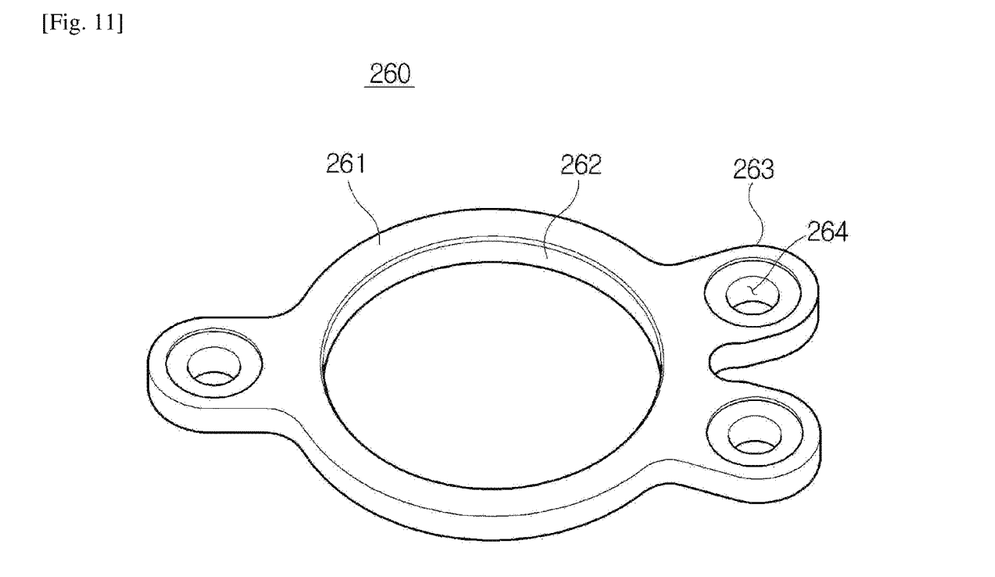
FIG. 11 is a perspective view for explaining a fixing member of the pumping apparatus illustrated in FIGS. 2 and 3.

That is, as illustrated in detail in FIG. 11, since the fixing member 260 has a fastening function for fixing the pumping apparatus 200 and a function of providing the stop friction surface 262 for the brake unit 250 and is also configured to be open at the front and rear thereof and have a simple annular shape, similar to the clutch drum 244a, the fixing member 260 enables the weight of the pumping apparatus to be significantly reduced compared to the related art. In addition, since the pumping apparatus has a simple structure, it is possible to easily control tolerances when it is manufactured.

The cover member 270 is coupled to the rear end of the fixing member 260 and prevents the axial separation of the clutch unit 240 and the brake unit 250 that are accommodated in the housing 220 and the fixing member 260. The cover member 270 may be formed by pressing a metal plate having a thinner cross-sectional thickness and a lighter weight than the fixing member 260.

That is, unlike the related art, the brake unit 250 according to the embodiment of the present invention is accommodated in the brake drum 261 that is open at the front and rear thereof and has a simple annular shape. Accordingly, the weight of the pumping apparatus 200 can be further reduced by applying the plate cover member 270, which has a thinner thickness and a lower specific gravity than the fixing member 260, to the pumping apparatus 200 in order to prevent the axial separation of the brake unit 250.

In addition, the cover member 270 includes a cover body 271 that has a hole through which the output gear 251c of the output member 251 extends, and a plurality of fastening legs 272 that extend in the axial direction (X-X') from the outer peripheral surface of the cover body 271 to be fastened to the housing 220 while enclosing the fixing member 260.

As illustrated in FIGS. 2 and 3, the fastening legs 272 serve to securely couple the fixing member 260 to the housing 220 using bent portions 273 that are bent from the ends of the fastening legs 272.

Figure 6:
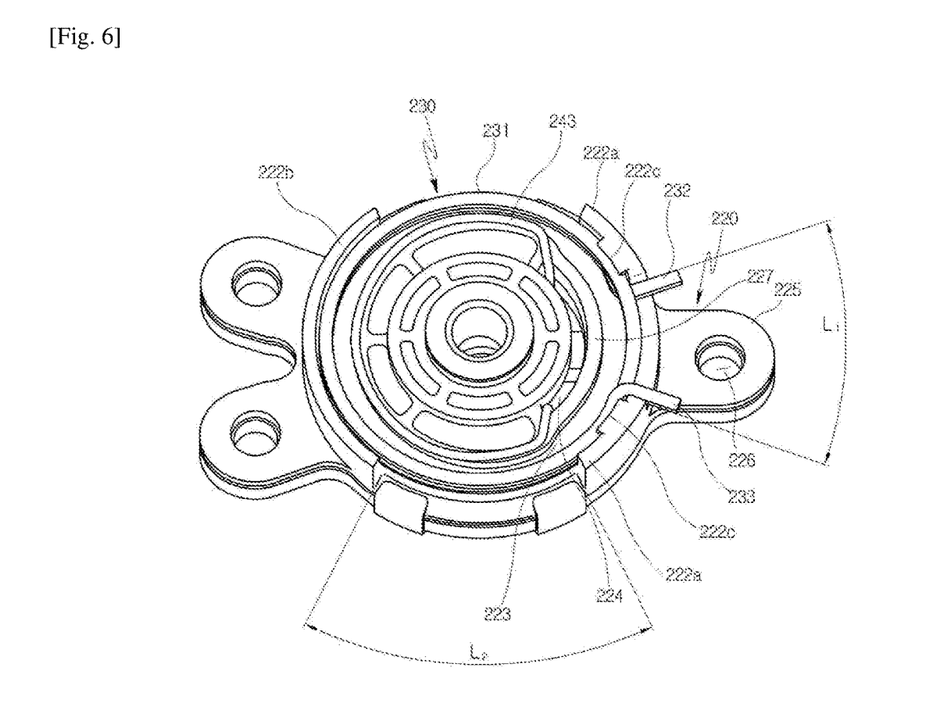
FIGS. 6 and 7 are perspective views for explaining a housing and a return spring of the pumping apparatus illustrated in FIGS. 2 and 3.
Figure 7:
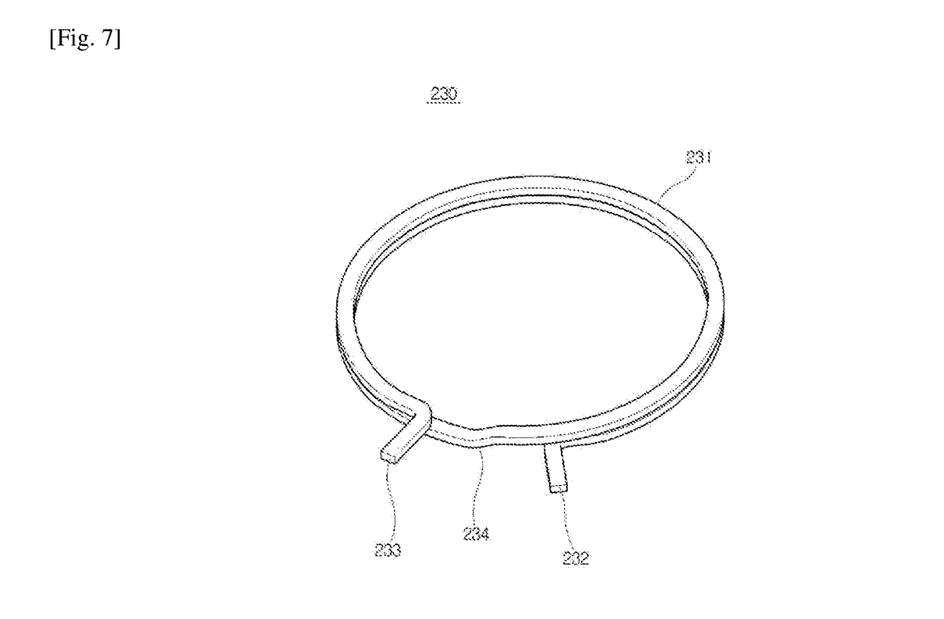

FIGS. 6 and 7 are perspective views for explaining the housing 220 and the return spring 230 of the pumping apparatus 200 illustrated in FIGS. 2 and 3.

Referring to FIGS. 6 and 7, the above-mentioned housing 220 of the pumping apparatus according to the embodiment of the present invention includes the cylindrical body 221 that has the through-hole 221a formed therein, and a plurality of stopper protrusions 222 that protrude from the outer surface of the cylindrical body 221, wherein the stopper protrusions 222 includes the pair of first stopper protrusions 222a that are spaced at the first distance L1 from each other and the second stopper protrusion 222b that is spaced at the second distance L2 from the first stopper protrusions 222a.

Figure 5:
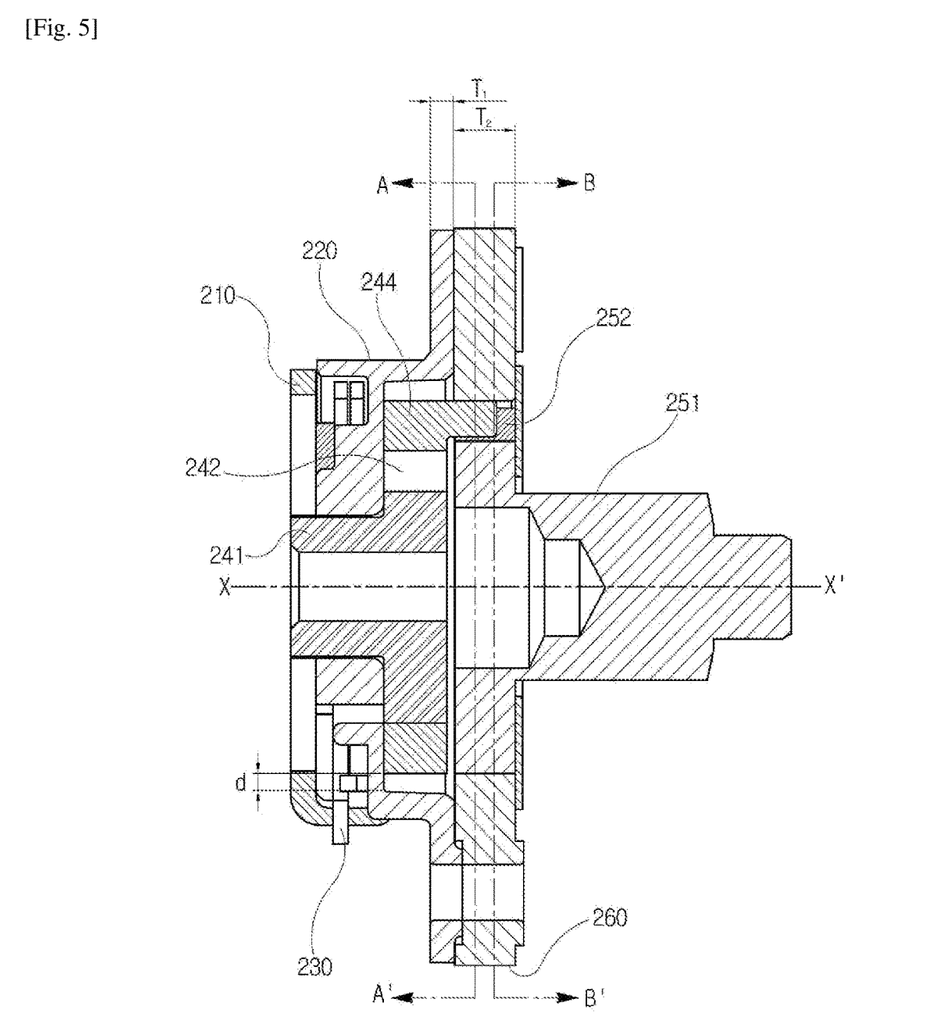
FIG. 5 is an axial cross-sectional view of the pumping apparatus illustrated in FIGS. 2 and 3.

As illustrated in FIG. 5, the cylindrical body 221 has a space defined therein for accommodating the second input member 241 and the clutch unit 240 which are described above. The cylindrical body 221 has a substantially uniform cross-sectional thickness t1, and preferably a smaller thickness than the cross-sectional thickness t2 of the fixing member 260 which will be described later. In addition, a flange 225 having a flange hole 226 corresponding to the fastening hole 264 of the fixing member 260 may be provided on the outer surface of the cylindrical body 221, and the fastener passes through both the flange hole 226 and the fastening hole 264.

Meanwhile, the housing 220 is a component that is not involved in directly transmitting torque or rotational force, unlike the input member and the clutch unit 240.

Accordingly, since the cross-sectional thickness t1 of the housing 220 is reduced compared to the cross-sectional thickness t2 of the fixing member 260 to which a very large load is applied during the action of reverse input torque, the weight of the housing 220, and moreover the total weight of the pumping apparatus 200 can be reduced.

As illustrated in FIG. 5, only the components of the clutch unit 240 are accommodated in the housing 220 of the pumping apparatus 200 according to the embodiment of the present invention, and the components of the brake unit 250 are accommodated in the brake drum 261 of the fixing member 260. That is, the brake unit 250 is disposed behind the housing 220. In other words, the portion for accommodating the clutch unit 240 is separated from the portion for accommodating the brake unit 250 so that the portion for accommodating the brake unit 250 is excluded from the housing 220. Thus, the axial dimension of the housing 220 can be reduced and therefore the weight of the housing 220 can be further reduced.

Moreover, since the housing 220 is made of a material with lower strength or a lower specific gravity than the fixing member 260, and preferably of a lightweight metal material such as aluminum or a synthetic resin material, the weight of the housing 220 can be further reduced compared to the related art.

The first stopper protrusions 222a protrude from the front edge of the cylindrical body 221 in a direction parallel to the axial direction (X-X') and are spaced at a certain distance, preferably at the first distance L1, from each other. The first stopper protrusions 222a serve to support the first and second ends 232 and 233 of the return spring 230 in a state in which a certain pre-load is applied to the return spring 230 as illustrated in FIG. 7.

That is, as illustrated in FIG. 6, the first and second ends 232 and 233 of the return spring 230 extend between the first stopper protrusions 222a, and are respectively disposed to be in contact with the first stopper protrusions 222a in the initial state.

As illustrated in the drawings, the first stopper protrusions 222a may be respectively provided with retainer protrusions 222c that protrude radially inwardly therefrom in order to prevent the separation of the return spring 230.

Accordingly, the heights of the first and second stopper protrusions 222a and 222b protruding in the axial direction (X-X') are affected by the axial dimension of the return spring 230 in order to prevent the separation of the return spring 230. In this case, as illustrated in FIG. 7, since the first and second ends 232 and 233 are maintained at the almost same position in the axial direction (X-X') by the ring 231 of the return spring 230, and specifically by a bending portion 234 formed between the first and second ends 232 and 233, the axial dimension of the return spring 230 is reduced. Therefore, it is possible to restrict the heights of the first and second stopper protrusions 222a and 222b protruding in the axial direction (X-X') below a certain level.

Accordingly, the total axial dimension of the housing 220 can be restricted below a certain level, and the dimension of the pumping apparatus 200 can thus be reduced below a certain level.

Similar to the first stopper protrusions 222a, the second stopper protrusion 222b protrudes from the front edge of the cylindrical body 221 in a direction parallel to the axial direction (X-X') and is spaced at the second distance L2 from the first stopper protrusions 222a. The second stopper protrusion 222b serves to restrict the angle of rotation of the first input member 210.

That is, the stop leg 213 of the first input member 210 is inserted between the second and first stopper protrusions 222b and 222a so that the angle of rotation of the first input member 210 is restricted to the second distance L2 between the first and second stopper protrusions 222a and 222b, thereby enabling the excessive rotation of the input members to be prevented.

Moreover, as illustrated in the drawings, the housing 220 may further include a boss 227 that is formed around the through-hole 221a of the cylindrical body 221 and extends in a direction parallel to the axial direction X-X'. The housing 220 may have an annular spring groove 223 formed between the outer peripheral surface of the boss 227 and the first stopper protrusions 222a and between the outer peripheral surface of the boss 227 and the second stopper protrusion 222b to accommodate the ring 231 of the return spring 230, and the spring groove 223 has a shape corresponding to the ring 231.

Hereinafter, the operation of the clutch unit 240 of the pumping apparatus 200 according to the embodiment of the present invention will be described with reference to FIGS. 8 and 9.

Figure 9:
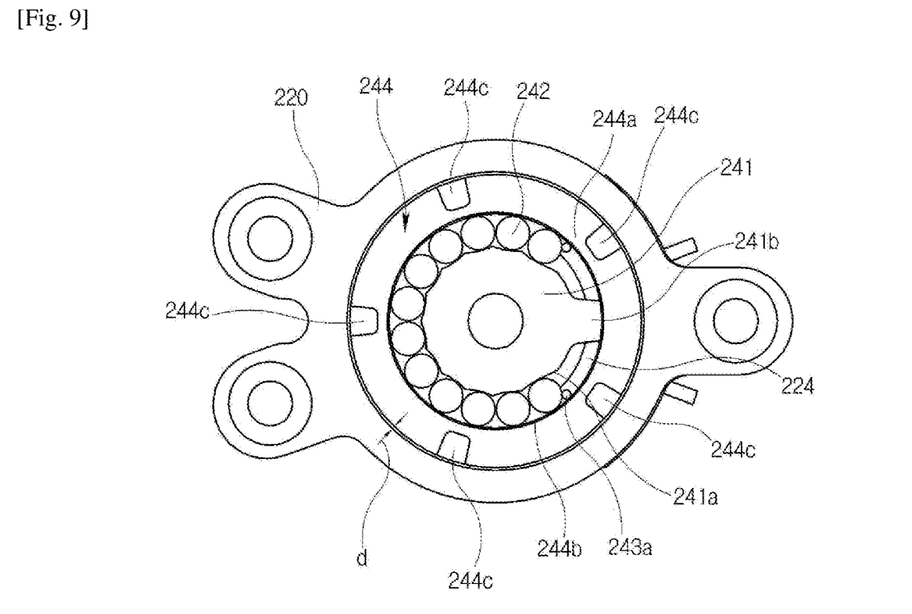
FIG. 9 is a cross-sectional view taken along line A-A' of FIG. 5.

As illustrated in FIG. 9, the rear end of the second input member 241 having the cam surfaces 241a formed thereon is located at the center of the clutch drum 244a. As illustrated in FIG. 8, the clutch friction surface 244b coming into frictional contact with the clutch rollers 242 is formed on the inner peripheral surface of the clutch drum 244a that is open at the front and rear thereof.

The clutch rollers 242 are inserted between the respective cam surfaces 241a formed on the outer peripheral surface of the second input member 241 and the clutch friction surface 244b of the clutch drum 244a, and come into contact with the respective cam surfaces 241a of the second input member 241 and the clutch friction surface 244b of the clutch drum 244a.

In this case, when the user rotates the first and second input members 210 and 241 using the handle lever in order to adjust the height of the seat, the clutch rollers 242 rotate in the same direction as the input members while the clutch spring 243, which presses the clutch rollers 242, is compressed in the rotational direction, and at the same time the control member 244 begins to rotate.

The rotational force or torque of the control member 244 is transmitted to the wedge rollers 252 of the brake unit 250 through the control protrusions 244c.

When the rotational force applied to the second input member 241 is then released, the clutch rollers 242 are returned to the initial positions by the elastic restoring force of the compressed clutch spring 243.

Although FIG. 9 illustrates that a plurality of clutch rollers 242 are pressed against a portion of the outer peripheral surface of the second input member 241 and a guide protrusion 241b for maintaining the control member 244 and the second input member 241 on the same center is provided on another portion of the outer peripheral surface of the second input member 241, which is not formed with the clutch rollers 242, the present invention is not limited thereto. In the present invention, the clutch rollers 242 may be naturally arranged throughout the outer peripheral surface of the second input member 241.

Meanwhile, a predetermined gap d is preferably formed between the inner peripheral surface of the body 221 of the housing 220 accommodating the clutch unit 240 and the outer peripheral surface of the control member 244, as illustrated in FIG. 9.

This is to prevent abrasion and noise that may occur between the fixed housing 220 with relatively low strength and the rotating control member 244 with relatively high strength.

Next, the operation of the brake unit 250 of the pumping apparatus 200 according to the embodiment of the present invention will be described with reference to FIGS. 10 and 11.

When the user rotates the first and second input members 210 and 241 using the handle lever as described above, the control member 244 rotates through the clutch rollers 242 and the rotational force or torque of the control member 244 is transmitted to the wedge rollers 252 through the control protrusions 244c.

Figure 10:
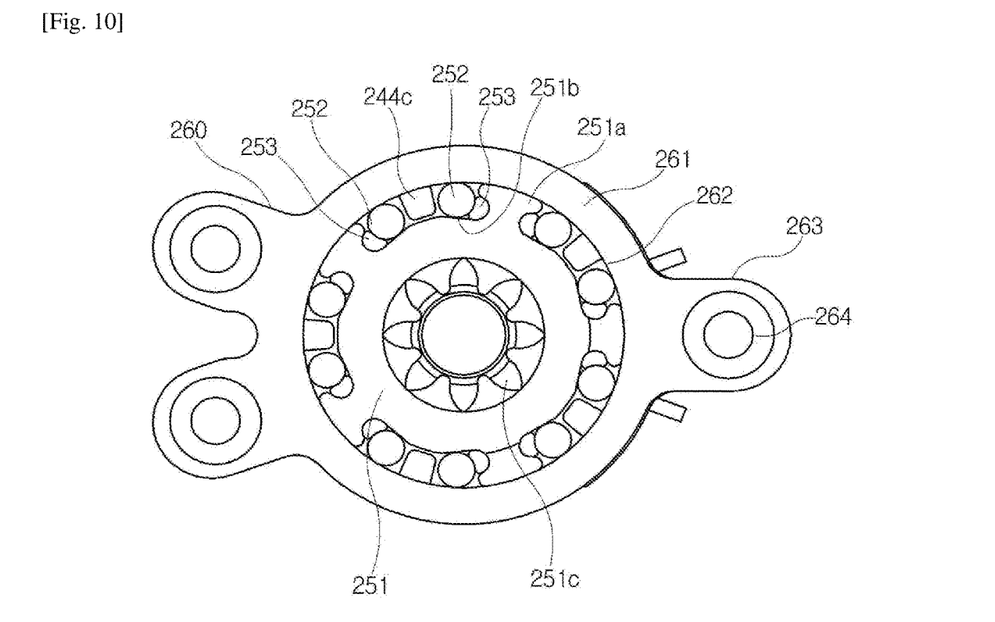
FIG. 10 is a cross-sectional view taken along line B-B' of FIG. 5.

In more detail, each control protrusion 244c extending between the associated pair of wedge rollers 252 rotates in one direction, e.g. clockwise or counterclockwise in FIG. 10, along with the rotation of the control member 244.

When the control protrusion 244c rotates in one direction so that one of the pair of wedge rollers 252 is pressed in the rotational direction, the braking of the pressed wedge roller 252 is released and the rotational force or torque of the control protrusion 244c is transmitted to the associated wedge boss 251a via the pressed wedge roller 252 and wedge spring 253. Consequently, the output member 251 begins to rotate.

When the output member 251 rotates, the height of the seat is adjusted by the operation of the link mechanism connected to the output gear 251c.

When the operation of the user is stopped after the height adjustment of the seat is completed, the wedge rollers 252, which are pressed by the control protrusions 244c, are pressed in a direction opposite to the above pressure direction by the wedge springs 253, i.e. in a direction in which the wedge rollers 252 move away from the wedge bosses 251a. Thus, the rotation of the output member 251 is restrained by the wedge rollers 252 and the stop friction surface 262 of the brake drum 261 illustrated in FIG. 11, so that the braking of the output member 251 is implemented.

Figure 12:
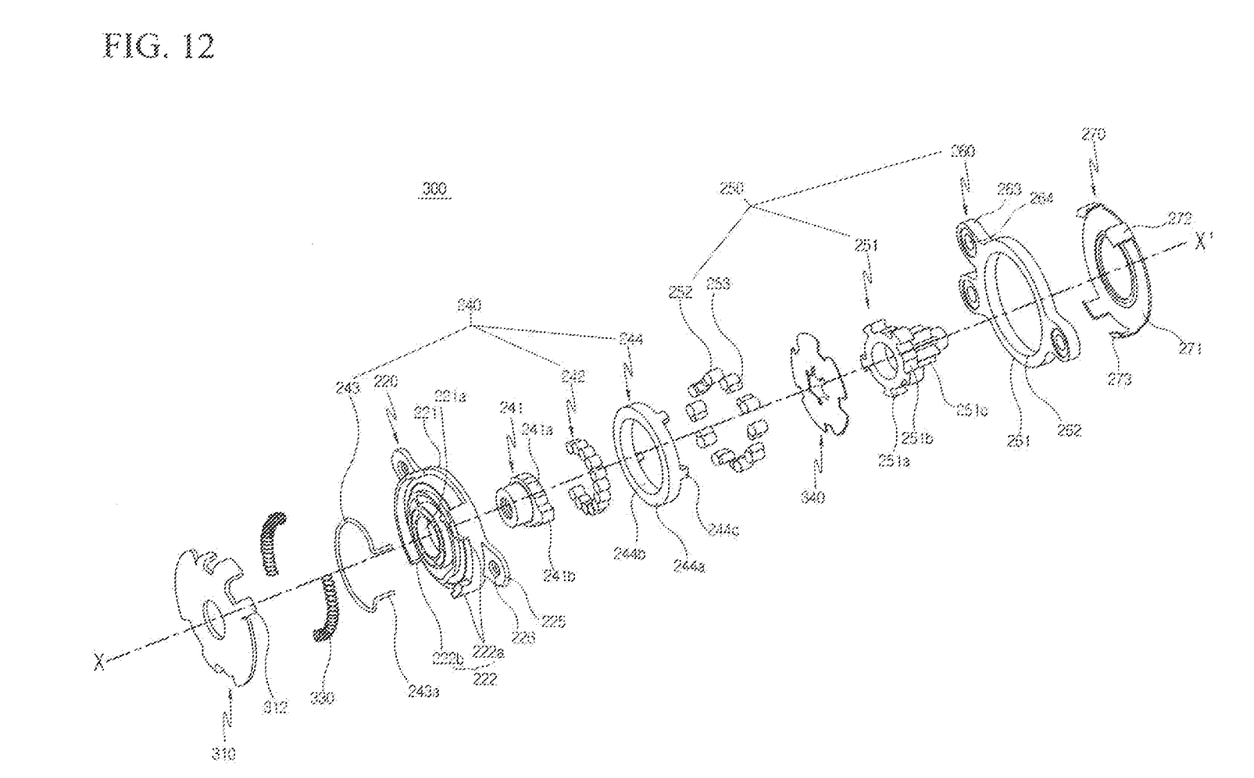
FIG. 12 is an exploded perspective view illustrating a pumping apparatus according to another embodiment of the present invention.
Figure 13:
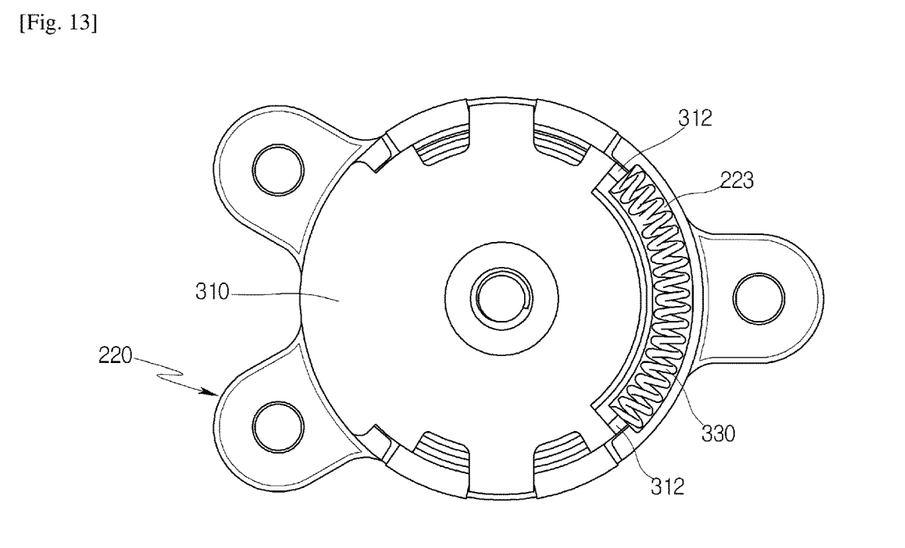
FIG. 13 is a front view illustrating the pumping apparatus according to another embodiment of the present invention.
Figure 14:
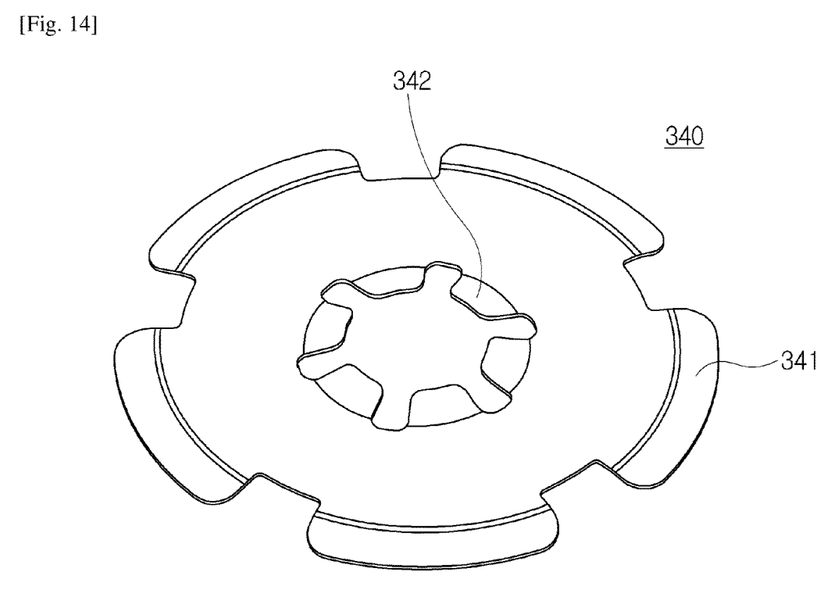
FIG. 14 is a front perspective view for explaining an elastic member of the pumping apparatus according to another embodiment of the present invention.

FIG. 12 is an exploded perspective view illustrating a pumping apparatus according to another embodiment of the present invention. FIG. 13 is a front view illustrating the pumping apparatus according to another embodiment of the present invention. FIG. 14 is a front perspective view for explaining an elastic member of the pumping apparatus according to another embodiment of the present invention.

Referring to FIGS. 12 and 13, the pumping apparatus, which is designated by reference numeral 300, according to another embodiment of the present invention is similar to the pumping apparatus 200 according to the above-mentioned embodiment of the present invention, except for a return spring 330 and a first input member 310. Accordingly, since like reference numerals in FIG. 12 refer to like components of the pumping apparatus 200 illustrated in FIG. 4, detailed description thereof will be omitted.

The return spring 330 has a coil shape, and is inserted into the spring groove 223 formed in the housing 220. The first input member 310 has a pair of pressure legs 312 that are bent inward from the end thereof, and the pressure legs 312 are inserted into the spring grove 223 to be disposed at both sides of the return spring 330.

Here, the return spring 330 may consist of two return springs, and the pair of pressure legs 312 of the first input member 310 may consist of two pairs of pressure legs (i.e. four pressure legs) to respectively press two return springs 330.

It is possible to more effectively reduce occurrence of noise by application of two coil-shaped return springs 330.

Referring to FIGS. 12 and 14, the pumping apparatus 300 according to another embodiment of the present invention further includes an elastic member 340.

The elastic member 340 is disposed between the control member 244 and the output member 251, and provides an elastic force such that the second input member 241 is pressed against the housing 220.

That is, the elastic member 340 supports the second input member 241 and is formed to enclose the clutch rollers 242 and the control member 244.

In more detail, the elastic member 340 has a disk shape as a whole, and includes a control member coupling portion 341 that is formed at the radially outer end thereof and has grooves into which the control protrusions 244c of the control member 244 are fitted. The elastic member 340 has a pressure member 342 that is bent inward from the open center thereof and elastically supports the second input member 241 by contact therewith.

Through such a structure, since the elastic member 340 elastically supports the second input member 241, it is possible to reduce distances and friction between parts and to reduce the total size and weight of the pumping apparatus.

As is apparent from the above description, in accordance with exemplary embodiments of the present invention, the weight of a pumping apparatus for a vehicle seat can be significantly reduced, and since the pumping apparatus has a simple structure, it is possible to easily control tolerances when it is manufactured and to significantly reduce the cost of manufacture.

In addition, the weight of the pumping apparatus can be further reduced by application of a housing with a relatively lower specific gravity and strength than a control member and a fixing member.

It will be understood that the above-mentioned technical configurations of the exemplary embodiments may be executed in order to enable those of ordinary skill in the art to embody and practice the invention in other specific forms without changing the spirit or essential features of the invention.

Although the present invention has been described with respect to the illustrative embodiments, it will be apparent to those skilled in the art that various variations and modifications may be made without departing from the spirit and scope of the invention as defined in the following claims.

What is claimed is:

1. A pumping apparatus for a vehicle seat, comprising:
a first input member rotated by torque input from a handle lever;
a second input member forcibly connected to the first input member;
a clutch unit configured to transmit the input torque to a link mechanism of a seat cushion;
a brake unit configured to cut off the torque input in reverse from the link mechanism;
a housing accommodating the clutch unit therein; and
a fixing member coupled to a rear end of the housing to be fastened to one side of a seat, wherein
the first input member is disposed in front of the housing, and the second input member is accommodated in the housing, and
the clutch unit comprises a torque transmission member arranged on an outer peripheral surface of the second input member, and an annular control member having a clutch friction surface formed on an inner peripheral surface thereof for frictional engagement with the torque transmission member, the control member being open at front and rear portions thereof characterized in that,
the housing is configured such that only the components of the clutch unit are accommodated in the housing, and
the components of the brake unit are accommodated in a brake drum of the fixing member such that the brake unit is disposed behind the housing and a portion of the pumping apparatus accommodating the clutch unit and a portion of the pumping apparatus accommodating the brake unit are separated from each other.

2. The pumping apparatus according to claim 1, wherein the fixing member further comprises an annular brake drum having a stop friction surface formed on an inner peripheral surface thereof for braking of the brake unit and accommodating the brake unit, the brake drum being open at front and rear portions thereof.

3. The pumping apparatus according to claim 1, further comprising a plate cover member disposed behind the fixing member so as to prevent axial separation of the clutch unit and the brake unit and fastened to the housing while enclosing the fixing member so as to couple the fixing member to the housing.

4. The pumping apparatus according to claim 3, wherein the brake unit comprises:
an output member configured such that a rear end thereof is connected to the link mechanism and a wedge inclined surface is formed on an outer peripheral surface of a front end thereof; and
a plurality of braking members inserted between the wedge inclined surface and the stop friction surface to control rotation of the output member, and
wherein the brake unit is disposed behind the housing.

5. The pumping apparatus according to claim 4, wherein the fixing member is made of a metal material and the housing is made of a synthetic resin material.

6. The pumping apparatus according to claim 4, further comprising an elastic member disposed between the control member and the output member, for providing an elastic force such that the second input member is pressed against the housing.

7. The pumping apparatus according to claim 1, further comprising a return spring disposed between the housing and the first input member, for providing a restoring force to the first input member.

8. The pumping apparatus according to claim 7, wherein the return spring comprises:
an annular ring; and
first and second ends bent radially outwardly from the ring.

9. The pumping apparatus according to claim 8, wherein the return spring further comprises a bending portion formed in the ring between the first end and the second end so that the first and second ends are maintained at the same position in an axial direction of the first input member.

10. The pumping apparatus according to claim 9, wherein the first input member comprises:
a disk having a center hole into which a front end of the second input member is fixedly inserted; and
a pair of pressure legs extending and bent from an outer peripheral surface of the disk, and
wherein the first and second ends extend between the pair of pressure legs so that the restoring force of the return spring is transmitted through the pressure legs.

11. The pumping apparatus according to claim 10, wherein the housing comprises:

a cylindrical body accommodating the clutch unit therein and having a through-hole through which the front end of the second input member extends;

a pair of first stopper protrusions extending from a front edge of the cylindrical body in a direction parallel to the axial direction and spaced at a first distance from each other; and a second stopper protrusion extending from the front edge of the cylindrical body in a direction parallel to the axial direction and spaced at a second distance from the pair of first stopper protrusions, and wherein the first and second ends of the return spring extend between the pair of first stopper protrusions.

12. The pumping apparatus according to claim 11, wherein:

the first input member further comprises at least one stop leg extending and bent from the outer peripheral surface of the disk; and the stop leg extends between the first and second stopper protrusions so that an angle of rotation of the first input member is restricted to the second distance.

13. The pumping apparatus according to claim 12, wherein:

the housing further comprises a boss formed around the through-hole of the cylindrical body and extending in a direction parallel to the axial direction; and the housing has a spring groove formed between an outer peripheral surface of the boss and the pair of first stopper protrusions and between the outer peripheral surface of the boss and the second stopper protrusion to accommodate the ring of the return spring.

14. The pumping apparatus according to claim 7, wherein the return spring has a coil shape and is inserted into a spring groove formed in the housing, and the return spring is pressed by a pair of pressure legs of the first input member that are inserted into both sides of the spring groove.

15. The pumping apparatus according to claim 1, wherein a predetermined gap is formed between an outer peripheral surface of the control member and an inner peripheral surface of the housing.

\* \* \* \* \*